United States Patent [19]

Matsunaga et al.

[11] Patent Number: 4,598,222
[45] Date of Patent: Jul. 1, 1986

[54] DIRECT CURRENT MACHINE

[75] Inventors: Katsuo Matsunaga, Nitta; Osami Kanbe; Hiroyuki Otaki, both of Kiryu, all of Japan

[73] Assignee: Mitsuba Electric Manufacturing Co., Ltd., Japan

[21] Appl. No.: 677,837

[22] Filed: Dec. 4, 1984

[30] Foreign Application Priority Data

Dec. 20, 1983 [JP] Japan .................. 58-195671[U]

[51] Int. Cl.⁴ .............................................. H02K 3/00
[52] U.S. Cl. ....................................... 310/198; 310/46; 310/234
[58] Field of Search .................. 310/46, 40 MM, 154, 310/177, 198, 200, 201, 202, 203, 204, 205, 206, 207, 234; 318/439

[56] References Cited

U.S. PATENT DOCUMENTS 3,466,482  9/1969  Peters .................................. 310/177
3,733,506  5/1973  Jaffe .................................... 310/198
3,863,336  2/1975  Noto .................................... 310/260
4,107,587  8/1978  Ban ..................................... 310/439
4,227,107  10/1980 Ban ..................................... 310/46
4,341,971  7/1982  Tahara ................................. 310/204
4,404,485  9/1983  Ban ..................................... 310/207
4,417,388  11/1983 Major ................................... 310/206

FOREIGN PATENT DOCUMENTS 0843576  7/1952  Fed. Rep. of Germany ...... 310/203
0949621  2/1964  United Kingdom ................ 310/203

Primary Examiner—R. Skudy
Attorney, Agent, or Firm—Kane, Dalsimer, Kane, Sullivan and Kurucz

[57] ABSTRACT

This disclosure depicts a direct current machine having an armature, in which a plurality of coils are opposed to each of a plurality of field poles and coil-wound in a special wave winding. In this special wave winding, each of the coils is divided into two or more divided coil members for the coil-winding, and coil sides associated with each other of each of these divided coil members are wound into slots adjacent to each other.

5 Claims, 5 Drawing Figures

DIRECT CURRENT MACHINE

BACKGROUND OF THE INVENTION

1. Field of the Invention

This invention relates to direct current (DC) machines, particularly to a direct current (DC) motor, and more specifically to improvements in an armature thereof.

2. Description of the Prior Art

As a multipolar DC motor, there has heretofore been used one shown in FIG. 1 for example.

More specifically, this DC motor includes magnets 52 as being a plurality of field poles arranged annularly at positions substantially equidistant from one another on the inner periphery of a cylindrical yoke 51 and an armature 53 shown in FIG. 2. This armature 53 includes a core 55 coupled to a rotary shaft 54 and a plurality of coils 56 being coil-wound on this core 55. The respective coils 56 are coil-wound in the lap winding in slots 57 formed in plural number in the core 55. A commutator 58 is coupled to the rotary shaft 54 and a plurality of brushes 59 are brought into sliding contact with the commutator 58.

Then, the brushes 59 and the commutator 58 feed the power to the respective coils 56 of the armature 53, whereby the armature 53 rotates, cutting the fields of the magnets 52.

However, since, in the conventional DC motor of the type described, the armature is constructed such that coils are coil-wound in the lap winding wherein a coil is overlapped another one adjacent thereto and this overlapping is repeated, such disadvantages are presented that excessively thick coil windings occur, whereby the usage at coil ends of the respective coils, which are portions not acting electromagnetically, is increased, so that the weight is increased, the cost is also raised, and moreover, improvements in performance is substantially suppressed. Because of this, there are such drawbacks that demands cannot be met for rendering the armature, in its turn, the DC motor, light in weight, thin in shape, compact in size, low in cost and high in resource saving capability, and moreover, heat radiating property is low.

Furthermore, according to the conventional technique, two winding end lines are led out of each coil, whereby the number of outgoing lines to be wound on the commutator is increased, so that it becomes difficult to connect the outgoing lines to respective segments of the commutator. Consequently, there has been a problem that, in order to secure the required number of segments, it is necessary to form the commutator into a complicated shape such as a generally two-stepped column-shape to have a large diameter as shown in FIGS. 1 and 2.

Further, to eliminate electromagnetically unnecessary coil portions, it is considered that the pitch angle of each pole should be made small to shorten the winding pitch of coil. However, according to the conventional technique, it has been unable to solve such a problem as described above.

Furthermore, the coil may be formed into a divided construction according to the conventional lap winding method. However, four or more brushes are required, whereby such disadvantages are presented that the number of brushes is increased, the degree of freedom in the provision of the brushes is lowered, and moreover, the automatic winding operation becomes difficult due to the decrease of mechanical strength of the coil by the reduced diameter thereof and the resultant disconnections.

On the other hand, in contrast to the above-described lap winding method, the winding construction according to the wave winding method has been widely used. According to the wave winding method, the portion of the start of winding is equal in length to the portion of the end of winding unlike the case of the lap winding method, so that a well-balanced winding can be obtained as compared with the lap winding method.

However, according to the conventional wave winding method, although the number of brushes can be decreased, the number of segments is increased, whereby it becomes necessary to form the commutator into a complicated shape such as a two-stepped column-shape to secure a required number of segments similarly to the case of the lap winding method. Therefore, the conventional wave winding method is disadvantageous in that the commutator should be of a large diameter and complicated in shape.

SUMMARY OF THE INVENTION

An object of the present invention is to provide a DC machine capable of displaying a high performance while preventing the excessively thick coil winding, and avoiding a large diameter and a complicated shape of a commutator.

Another object of the present invention is to provide a DC machine wherein an armature is rendered low in weight, thin in shape and compact in size.

A further object of the present invention is to provide a DC machine rendered low in cost and high in resource saving capability.

A still further object of the present invention is to provide a DC machine satisfactory in heat radiating property.

To achieve the above-described objects, the present invention contemplates that a coil in an armature is coil-wound according to a special wave winding, respective coil is divided into a plurality of divided coil members and these divided coil members are received in slots different from one another against a field pole.

Sides of divided coil members associated with each other are coil-wound in slots adjacent to each other.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DETAILED DESCRIPTION OF THE PREFERRED EMBODIMENT

Figure 3:
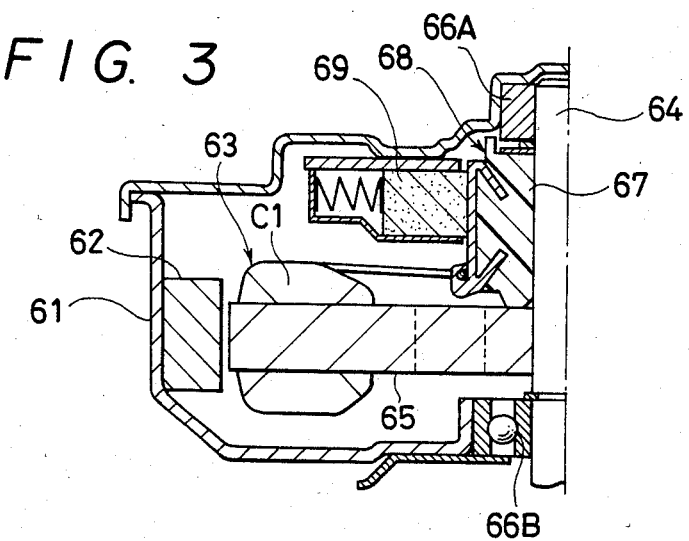
FIG. 3 is a semi-longitudinal sectional view showing an embodiment of a DC motor in accordance with the present invention.
Figure 4:
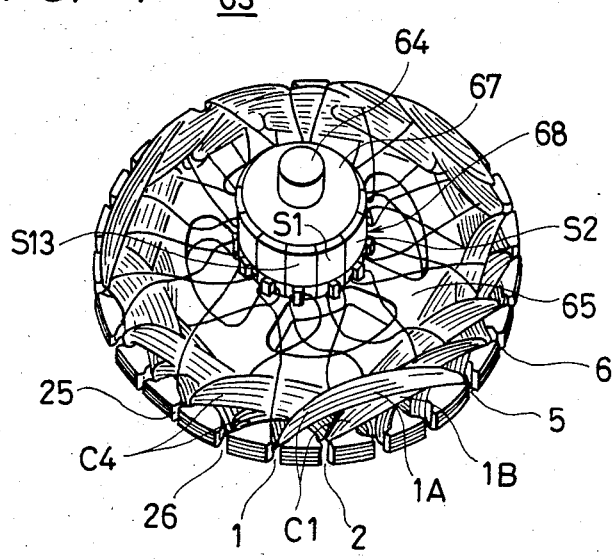
FIG. 4 is a perspective view showing the armature thereof.
Figure 5:
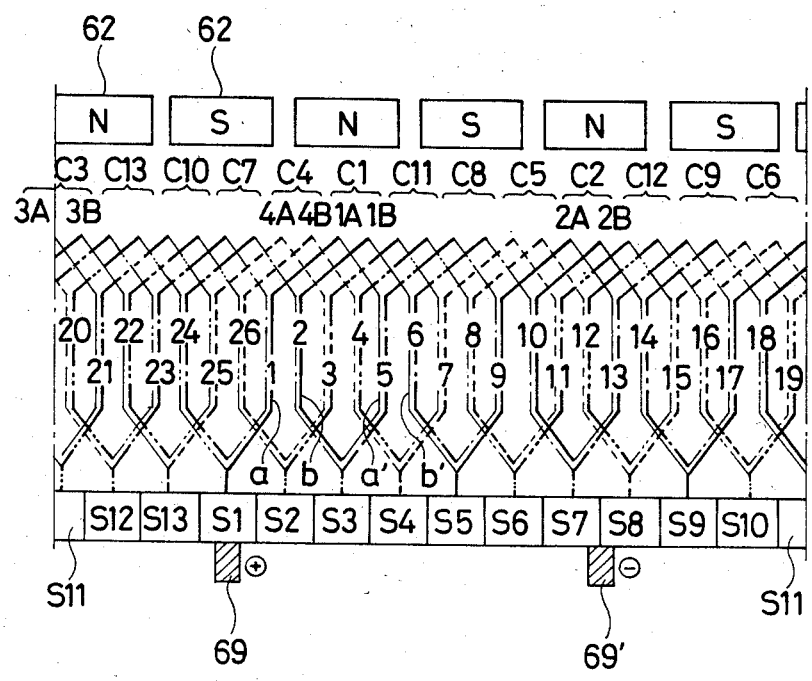
FIG. 5 is an unfolded view showing the coil-winding of a coil.

Referring now to the drawings, FIG. 3 is the semi-longitudinal sectional view showing one embodiment of the DC motor according to the present invention, FIG. 4 is the perspective view showing the armature thereof, and FIG. 5 is the unfolded view showing the coil-winding of the coil in the present invention.

In this embodiment, this DC motor is provided with six magnets 62 to form six field poles. These magnets 62 are arranged at positions substantially equidistant from one another on the inner periphery of a cylindrical yoke 61 and solidly secured thereto. Received in the yoke 61 is an armature 63 constructed as shown in FIGS. 4 and 5, and a rotary shaft 64 of this armature 63 is rotatably supported on the yoke 61 through an oilless bearing 66A and a ball bearing 66B. A commutator 68 is coupled onto the rotary shaft 64 at a position contiguous to the armature 63. The commutator 68 is of such an arrangement that a first to a thirteenth segments S1 to S13 are implanted at positions equidistant from one another on the outer periphery of a main body 67 integrally formed from an electrically insulating material such as synthetic resin into a generally columnar shape. Provided at positions outwardly of the commutator 68 in the yoke 61 are a pair of brushes 69 and 69', plus and minus, to be brought into sliding contact with the segments S1 to S13. The brushes 69 and 69' are constructed and wired so as to successively feed the power to the respective segments S1 to S13. The respective brushes 69 and 69' are arranged at positions opposite to each other in the diametrical direction of the commutator 68 and spaced 180 degrees apart from each other, and the breadth of each of the brushes 69 and 69' is at least slightly smaller than the breadth of each of the segments S1 to S13, whereby each of the brushes does not slide on three or more segments at a time.

The armature 63 includes a core 65 and a first to a thirteenth coils C1 to C13. This core 65 is constructed such that a multitude of thin sheets formed of ferromagnetic materials are laminated and formed into a generally disk-shape. A first to a twenty sixth slots 1 to 26 are cuttingly provided at positions equidistant from one another on the outer periphery of the core 65. Each of the coils C1 to C13 has a pair of divided coil members 1A and 1B to 13A and 13B, and the number of coil-windings of each of coils C1 to C13 is equally divided between the divided coil members constituting each pair. These divided coil members 1A and 1B to 13A and 13B are coil-wound in series through the slots 1 to 26 opposed to the respective magnets 62 as being the field poles as shown in FIG. 5 in a manner to constitute a special wave winding characteristic of the present invention.

More specifically, the first divided coil member 1A, the start of winding of which is connected to the first segment S1, is wound around a portion of the core 65 such that a first coil side a, out of a pair of coil sides thereof is received by the right side of the first slot 1 and a second coil side a' is received by the left side of the fifth slot 5, which is the fourth slot from the first slot 1. The second divided coil member 1B in this first coil C1 is wound around a portion of the core 65 such that a first coil side b, out of a pair of coil sides thereof is received by the right side of the second slot 2 adjacent the first slot 1, into which the first coil side a of the first divided coil member 1A is wound, and a second coil side b' is received by the left side of the sixth slot 6 adjacent the fifth slot 5, into which the second coil side a' of the first divided coil member 1A is wound. The end of winding of the second divided coil member 1B as being the end of winding of the first coil C1 is connected to the fifth segment S5.

Additionally, in FIG. 5, the first coil sides a and b of the respective coils C1 to C13, which are received by the right sides of the respective slots 1 to 26 are indicated by thick lines and the second coil sides a' and b' are indicated by thin lines, respectively.

In the fifth segment S5, the start of winding of the first divided coil member 2A as being the start of winding of the second coil C2 is connected to the end of winding of the first coil C1 in a manner to be engaged by a turnback pawl of the segment S5. The first divided coil member 2A in the second coil C2 is wound around a portion of the core 65 such that a first coil side out of a pair of coil sides is received by the right side of the ninth slot 9 and a second coil side is received by the left side of the thirteenth slot 13, which is the fourth slot from the ninth slot 9. The second divided coil member 2B in the second coil C2 is wound around a portion of the core 65 such that a first coil side out of a pair of coil sides thereof is received by the right side of the tenth slot 10 adjacent the ninth slot 9, into which the first coil side of the first divided coil member 2A is wound, and a second coil side is received by the left side of the fourteenth slot 14 adjacent the thirteenth slot 13, into which the second coil side is wound, which is the fourth slot from the tenth slot 10. The end of winding of the second divided coil member 2B as being the end of winding of the second coil C2 is connected to the ninth segment S9.

In this ninth segment S9, the start of winding of the first divided coil member 3A as being the start of winding of the third coil C3 is connected to the end of winding of the second coil C2 in a manner to be engaged by a turnback pawl of the segment 9. The first divided coil member 3A in the third coil C3 is wound around a portion of the core 65 such that the first coil side out of a pair of coil sides is received by the right side of the seventeenth slot 17 and a second coil side is received by the left side of the twenty first slot 21, which is the fourth slot from the seventeenth slot 17. The second divided coil member 3B in the third coil C3 is wound around a portion of the core 65 such that a first coil side out of a pair of coil sides is received by the right side of the eighteenth slot 18 adjacent the seventeenth slot 17, into which the first coil side of the first divided coil member 3A is wound, and a second coil side is received by the left side of the twenty second slot 22 adjacent the twenty first slot 21, into which the second coil side of the first divided coil member 3A is wound, which is the fourth slot from the eighteenth slot 18. The end of winding of the second divided coil member 3B as being the end of winding of the third coil C3 is connected to the thirteenth segment S13 adjacent the first segment S1, to which the start of winding of the first coil C1 is connected.

As described above, the first to the third coil C1 to C3 are wound forwardly through the six magnets 62 every other pole to make a round of the armature 63.

Then, the thirteenth segment S13 connected to the end of winding of the first to the third coils C1 to C3, which have made the round, is connected thereto with the start of winding of the fourth coil C4 in such a manner that the start of winding of the fourth coil C4 is engaged by a turnback pawl of the segment S13. A coil-winding to further make a round of the armature 63 is started from this fourth coil C4. More specifically, the fourth, the fifth and the sixth coils C4, C5 and C6 (all indicated by broken lines in FIG. 5) are wound forwardly through the six magnets 62 every other pole to make a round of the armature 63 similarly to the foregoing. The end of winding of the second divided coil member 6B as being the end of winding of the sixth coil C6 is connected to the twelfth segment S12 adjacent the thirteenth segment S13, to which the start of winding of the fourth coil C4 is connected.

Further, the twelfth segment S12, to which the end of winding of the fourth to the sixth coils C4 to C6, which have made a round of the armature 63, are connected thereto with the start of winding of the seventh coil C7, from which is started a coil-winding to further make a round of the armature 63. More specifically, the seventh, the eighth and the ninth coils C7, C8 and C9 (all indicated by one-dot chain lines in FIG. 5) are wound forwardly through the six magnets 62 every other pole and make a round of the armature 63 similarly to the foregoing. The end of winding of the second divided coil member 9b as being the end of winding of the ninth coil C9 is connected to the eleventh segment S11 adjacent the twelfth segment S12, to which is connected the start of winding of the seventh coil C7.

Then, the eleventh segment S11 connected to the end of winding of the seventh to the ninth coils C7 to C9, which have made the round, is connected thereto with the start of winding of the tenth coil 10. A coil-winding to further make a round of the armature 63 is started from this tenth coil C10. More specifically, the tenth, the eleventh, the twelfth and the thirteenth coils C10, C11, C12 and C13 (all indicated by two-dot chain lines in FIG. 5) are wound forwardly through the six magnets 62 every other pole to make a round of the armature 63 similarly to the foregoing. The end of winding of the second divided coil member 13B as being the end of winding of the thirteenth coil C13 is connected so as to return to the first segment S1, to which is connected the start of winding of the first coil C1, which has started first.

In the DC motor being of such an arrangement as described above, the thirteen coils C1 to C13 are coil-wound around the armature 63 in the special wave winding, each of the coils C1 to C13 is divided into two divided coil members 1A and 1B to 13A and 13B, the respective coil sides a, b and a', b' in each pair of divided coil members 1A and 1B to 13A and 13B are distributed and coil-wound in a manner to be received in the slots adjacent to each other, whereby the excessively thick coil winding is avoidable, so that the usage at the coil ends of the respective coils C1 to C13 can be decreased, and the weight, cost and the like can be reduced.

Figure 1:
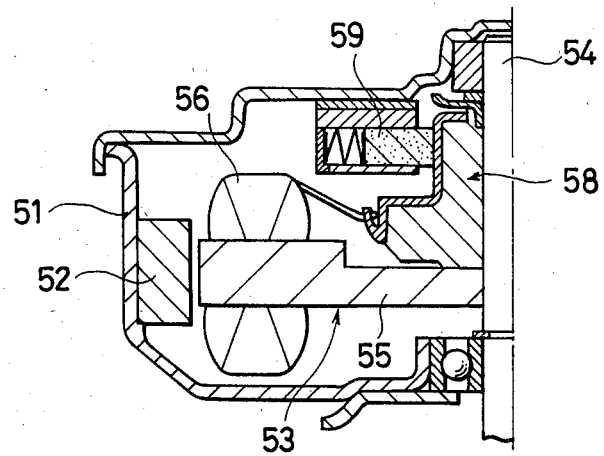
FIG. 1 is a semi-longitudinal sectional view showing a DC motor according to an example of the prior art.
Figure 2:
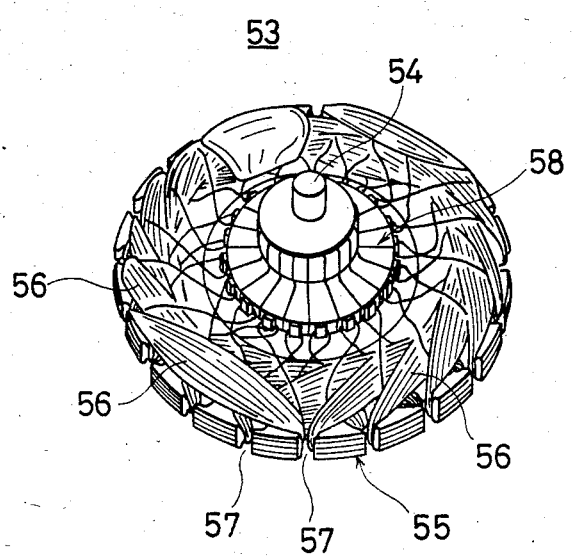
FIG. 2 is a perspective view showing the armature thereof.

Furthermore, it is determined that the number of field poles is six, and against the number of slots 26, the number of segments is 13, which is only half the number of slots, so that the commutator 68 may not be required to be large in its diameter, and may be formed into a simple column-shape. More specifically, if the number of segments would be large, then, the connection of the start of winding and the end of winding to each one of segments would be interfered with an adjoining one and it would be difficult to hold a satisfactory connection. Hence, it would become necessary to increase the breadths of the segments in order to widen the interval between the turnback pawls, with each of which the start of winding or the end of winding is engaged. As the result, the diameter of the commutator would be increased, and the shape of the commutator is formed into a two-stepped column-shape as shown in FIG. 2 to substantially increase the diameter of the commutator, which results in the disadvantages that the commutator cannot be rendered compact in size and light in weight, the cost cannot be reduced and so on. However, if the number of segments is small, then, these disadvantages can be avoided.

According to the present invention, in contrast to the above, the number of slots is set at 26, which is twice the number of segments, so that the arc of each pole can be set to be large to obtain a required number of magnetic fluxes and the torque ripple can be controlled to a low value, thus enabling to improve the performance to a considerable extent in cooperation with the multipolar characteristics of the commutator.

In addition, the present invention is not limited to the above embodiment, and can be applied to various modifications without departing from the spirit of the invention.

For example, the number of the divided coil numbers obtained by dividing respective coils need not necessarily be limited to two, and, three or more divided coil members may be used and the number of coil-winding may be different from one divided coil member to another.

The numbers, shapes, constructions and the like of the field poles, coils, slots, segments, brushes, etc. need not necessarily be limited to the numbers adopted in the above embodiment.

In the above embodiment, description has been given of the DC motor, however, the present invention need not necessarily be limited to this, and the present invention may be applied to various DC machines such as a DC generator.

As has been described hereinabove, according to the present invention, the armature is of such an arrangement that a plurality of coils are coil-wound in the special wave winding, each coil is divided into a plurality of divided coil members and respective coil sides in each divided coil member are distributed and coil-wound in a manner to be received in slots adjacent to each other, so that the seeking after the multipolar characteristics and high performance can be facilitated while the excessively thick coil winding, and the large diameter and the complicated construction of the commutator are avoided.

In consequence, according to the present invention, it is possible to render the armature light in weight, thin in shape and compact in size.

Furthermore, with the DC machine according to the present invention, the usage of coil can be economized, the cost thereof reduced, the resource saving capability thereof improved and the weight thereof rendered light.

According to the present invention, the excessively thick coil winding is eliminated, so that the heat radiating property can be improved.

What is claimed is:

1. A direct current machine comprising a commutator with a number of commutator segments; a number of field poles; and an armature in which a plurality of coils are opposed to respective field poles and are coil-wound in wave winding with one another, said armature further having a number of slots into which said coils are coil-wound; wherein each coil in said armature is divided into a plural number n of divided coil members coil-wound in series, each coil member having coil sides, the coil sides associated with each coil being disposed in adjacent slots; and wherein the number of slots is n times the number of commutator segments.

2. A direct current machine as set forth in claim 1, wherein the number of commutator segments is thirteen and the number of slots is twenty six.

3. A direct current machine as set forth in claim 1, wherein the number of the field poles is six.

4. A direct current machine as set forth in claim 1, wherein two brushes are disposed at positions diametrically opposite to each other with respect to the commutator.

5. A direct current machine as set forth in claim 4, wherein the breadth of each of the brushes is slightly smaller than the breadth of each of the commutator segments.

* * * * *